(12) United States Patent
Ho et al.

(10) Patent No.: US 7,187,707 B2
(45) Date of Patent: Mar. 6, 2007

(54) SYNCHRONIZATION CODE DETECTING APPARATUS FOR CELL SEARCH IN A CDMA SYSTEM

(75) Inventors: Jan-Shin Ho, Yi Lan (TW); Wern-Ho Sheen, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 840 days.

(21) Appl. No.: 10/324,296

(22) Filed: Dec. 20, 2002

(65) Prior Publication Data

US 2003/0193993 A1 Oct. 16, 2003

(30) Foreign Application Priority Data

Apr. 15, 2002 (TW) ................ 91107803 A

(51) Int. Cl.
*H04B 1/00* (2006.01)
(52) U.S. Cl. ................ 375/145; 375/142; 375/143; 375/149; 375/150; 375/152
(58) Field of Classification Search ........... 375/145, 375/142, 143, 149, 150, 152
See application file for complete search history.

(56) References Cited

U.S. PATENT DOCUMENTS 5,818,882 A * 10/1998 Komatsu ............... 375/344
5,999,561 A * 12/1999 Naden et al. ............ 375/142
6,363,060 B1 * 3/2002 Sarkar .................. 370/342
6,385,259 B1 * 5/2002 Sung et al. ............. 375/343
6,728,203 B2 * 4/2004 Wang ................... 370/210
2002/0018529 A1 * 2/2002 Dabek et al. ........... 375/267

OTHER PUBLICATIONS

Shenn, "Cell search for 3GPP W-CDMA/FDD with chip clock shift and non-ideal sampling" Vehicular Technology Conference, 2001. VTC 2001 Fall, IEEE VTS 54th vol. 4, Oct. 7-11, 2001, pp. 2369-2373 vol. 4).*

* cited by examiner

*Primary Examiner*—Temesghen Ghebretinsae
*Assistant Examiner*—Juan Alberto Torres
(74) *Attorney, Agent, or Firm*—Thomas, Kayden, Horstemeyer & Risley

(57) ABSTRACT

A synchronization code detecting apparatus is designed for synchronization code detection in cell search in a code division multiple access (CDMA) system. The synchronization code detecting apparatus mainly includes a compensation unit for providing frequency offset compensation to the incoming signal and for determining a plurality of sampling points of the incoming signal. A plurality of sub-detecting units is coupled to the compensation unit for detecting a synchronization code of the incoming signal transmitting from the compensation unit. A selection unit is coupled to the output of each sub-detecting unit for selecting a plurality of slot boundaries as a plurality of candidates to be forwarded to a second processing stage. Consequently, the synchronization code detecting apparatus effectively reduces the effect of clock offset in the system without increasing the hardware complexity and power consumption.

4 Claims, 9 Drawing Sheets

$$f_b = \frac{f_H - f_L}{N}$$

$$f_n = f_L + \frac{2n-1}{2} f_b, n=1,2,...N.$$

SYNCHRONIZATION CODE DETECTING APPARATUS FOR CELL SEARCH IN A CDMA SYSTEM

BACKGROUND OF THE INVENTION

1. Field of the Invention

This invention relates to a synchronization code detecting apparatus for cell search in a code division multiple access (CDMA) system and, more particularly, to a synchronization code detecting apparatus for cell search in a wideband code division multiple access (W-CDMA) system of $3^{rd}$ Generation Partnership Project (3GPP). The synchronization code detecting apparatus adopts a fully compensated structure or a partially compensated structure so that it can mitigate the adverse effect on cell search caused by the frequency offset.

2. Description of the Related Art

The CDMA cellular systems using a technique of direct sequence spread spectrum code division multiple accesses greatly increase their channel capacity. These systems have attracted much attention in the recent research of mobile communication systems. Generally speaking, the bandwidth efficiency of a CDMA system is better than other multiple access systems such as Frequency Division Multiple Access (FDMA) and Time Division Multiple Access (TDMA). Moreover, cell planning of a CDMA system is relatively simple. Therefore, CDMA systems will be prevalent in future mobile communication systems. It should be noted that 3GPP W-CDMA Frequency Division Duplex (FDD) systems have been adopted for use as one of the standards for International Mobile Telecommunications-2000 (IMT-2000), the third generation systems.

In a CDMA cellular system, a method using user equipment (UE) for searching the best cell is referred to as "cell search". High-speed cell search is crucial for reducing the switched-on delay (initial search) of the user equipment, increasing the standby time (idle mode search), and keeping a good quality of communication link in handover (active mode search).

Referring to FIG. 1 for understanding the frame structure of a 3GPP W-CDMA/FDD system. Firstly, in a 3GPP W-CDMA/FDD system, cell search is usually accomplished in three stages which includes two specially designed synchronization channels (SCH) and a common pilot channel (CPICH). In the first stage 110, the primary synchronization channel (PSCH) 111 is used for time slot synchronization. The PSCH 111 includes a primary synchronization code (PSC) defined as $ac_p$, wherein "a"($=\pm1$) depending on whether diversity transmission of the base station exists. In the second stage 120, the secondary synchronization channel (SSCH) 121 is used for frame/code group identification. The SSCH 121 includes secondary synchronization code (SSCs) defined as $ac_s$, wherein the coefficient a is equivalent to that of the PSCH 111. In the third stage 130, the common pilot channel 131 is used for determining a downlink scrambling code. As illustrated in the figure, there are 15 time slots in 10 ms radio frame. In addition, the system uses the speed of 3.84 Mchips/sec and therefore each radio frame consists of 38400 chips. That is to say, each time slot consists of 2560 chips. Moreover, both the PSC and the SSC of 256-chip long are transmitted at the beginning of each time slot. Thus, the PSC and SSC are time aligned for every 2560 chips long.

In recent years, high-speed cell search methods for use in CDMA cellular systems have been disclosed, for example, in U.S. Pat. No. 6,185,244, issued to Nystrom, et al., entitled "Cell searching in a CDMA communications system". In this prior art invention, a special coding structure is disclosed for more effectively acquiring a long code and frame timing during a cell search in a CDMA communications system. A code set of length M Q-ary code words including symbols from a set of Q short codes is defined with certain properties. The primary property to be satisfied is that no cyclic shift of a code word yields a valid code word. The other properties to be satisfied are that there is a one-to-one mapping between a long code message and a valid code word, and a decoder should be able to find both the random shift (thereby finding the frame timing) and the transmitted code word (i.e., its associated long code indication message) in the presence of interference and noise, with some degree of accuracy and reasonable complexity.

There are yet other cell search methods as follows:

U.S. Pat. No. 6,289,007, issued to Kim, et al., entitled "Method for Acquiring A Cell Site Station in Asynchronous CDMA Cellular Communication Systems"; and U.S. Pat. No. 6,038,250, issued to Shou, et al., entitled "Initial Synchronization Method And Receiver for Direct Sequence (DS)-CDMA Inter Base Station Asynchronous Cellular System."

However, the prior art cell search technology usually for use in a wideband code division multiple access (W-CDMA) system of $3^{rd}$ Generation Partnership Project (3GPP) involves two basic assumptions. The first assumption is that the sampling from the output of the chip-matched filter is an ideal sampling. Nevertheless, the actual sampling from the output of the chip-matched filter is a non-ideal sampling. The second assumption is that the chip rate of the transmitter is precisely known to the receiver (i.e. there is no clock offset). In other words, no frequency offset is set for the carrier frequency of the incoming signals. Actually, the frequency offset is caused by the instability in frequency of the transistor oscillator of the subscriber apparatus. For mobile user equipment, the frequency of the incoming signal carrier may have a frequency offset and therefore results in an uncertain range of the carrier frequency. The frequency offset results in two effects in the base frequency band: (1) phase rotation, and (2) clock offset. The clock offset has not been considered in the prior art. In the past, a phase rotation caused by a frequency offset can be eliminated by a synchronization code matched filter of a non-coherent structure. This technique is disclosed in "Initial frequency acquisition in W-CDMA," Y. P. E. Wang and T. Ottosson, IEEE Proc. VTC'99, Vol. 2, pp. 1013–1017, Sept. 1999.

However, the clock offset caused by the frequency offset exists between a base station and a user equipment, and this has not been considered in the prior art. Referring now to Table 1 that shows the relation between clock drift and time at different frequency offsets. For example, at a 12 kHz frequency offset, the sampling points in a 30 ms code frame involve 0.69 times of chip time offset that is equivalent to a 6 ppm frequency offset. This will result in an information error and a time increase in cell search. FIGS. 2(a) and 2(b) do not show the prior art technology. They show the output of the primary code matched filter under the clock drift effect caused by frequency offset. These figures show the results of the signal level decrease and the interference increase when the optimum sampling point shifts with time. According to the present inventions, clock offset stems from the frequency inaccuracies of the oscillators are not efficiently treated. However, performance of the cell search becomes intolerable in high frequency offset scenarios (e.g. frequency offset larger than 8 kHz). Therefore, there is a need to provide a novel cell search apparatus to effectively eliminate the frequency offset effect.

SUMMARY OF THE INVENTION

A primary object of the present invention is to provide a synchronization code detecting apparatus for cell search in a code division multiple access (CDMA) systems and, more particularly, to a synchronization code detecting apparatus for cell search in a third generation partnership project (3GPP) wideband code division multiple access (W-CDMA) system that can mitigate the adverse effect on cell search caused by the clock offset and can achieve high-speed cell search.

A secondary object of the present invention is to provide a synchronization code detecting apparatus for cell search in code division multiple access (CDMA) systems that can mitigate the adverse effect on cell search caused by the clock offset without increasing the hardware complexity and power consumption.

To achieve the above and other objects, the present invention provides a synchronization code detecting apparatus for detecting the synchronization code during cell search in a CDMA system. The apparatus detects an incoming signal from a base station. The incoming signal has an uncertain range of carrier frequency caused by a frequency offset. The synchronization code detecting apparatus includes a compensation unit for providing the frequency and/or clock compensation and for selecting the sampling points of the incoming signal. It also includes a first switching interface, which coupled to the compensation unit and have a plurality of switching ports, for outputting the incoming signal to a plurality of units. The plurality of sub-detecting units detect a synchronization code of the incoming signal, wherein the code is used for determining the slot boundary of the incoming signal. The uncertain range of carrier frequency is divided into a plurality of cells, and many of the sub-carrier frequencies are used as the reference frequencies of the plurality of sub-detecting units. A second switching interface is coupled to the sub-detecting units for outputting the incoming signal. And a selection unit is coupled to the second switching interface for selecting a plurality of possible candidates from the output of the sub-detecting units.

The synchronization code detecting apparatus of the present invention would mitigate the adverse effect on cell search caused by the clock offset in the system. The synchronization code detecting apparatus provides different frequency offset compensation structures for different degrees of frequency offsets according to the complexity and performance trade-offs, such as a fully compensated (FC) structure and a partially compensated (PC) structure. The synchronization code detecting apparatus would be adapted to various cell search methods and designs. In a practical application, the synchronization code detecting apparatus would be implemented by hardware, especially by an Application Specific Integrated Circuits (ASIC) implementation.

BRIEF DESCRIPTION OF THE DRAWINGS

Table 1 shows the sampling point drift under the conditions of different frequency offsets.

DETAILED DESCRIPTION OF PREFERRED EMBODIMENT

A frequency offset causes two effects in base frequency band: (1) a phase rotation, and (2) a clock offset, wherein a clock offset has not been considered in the prior art.

Figure 1:
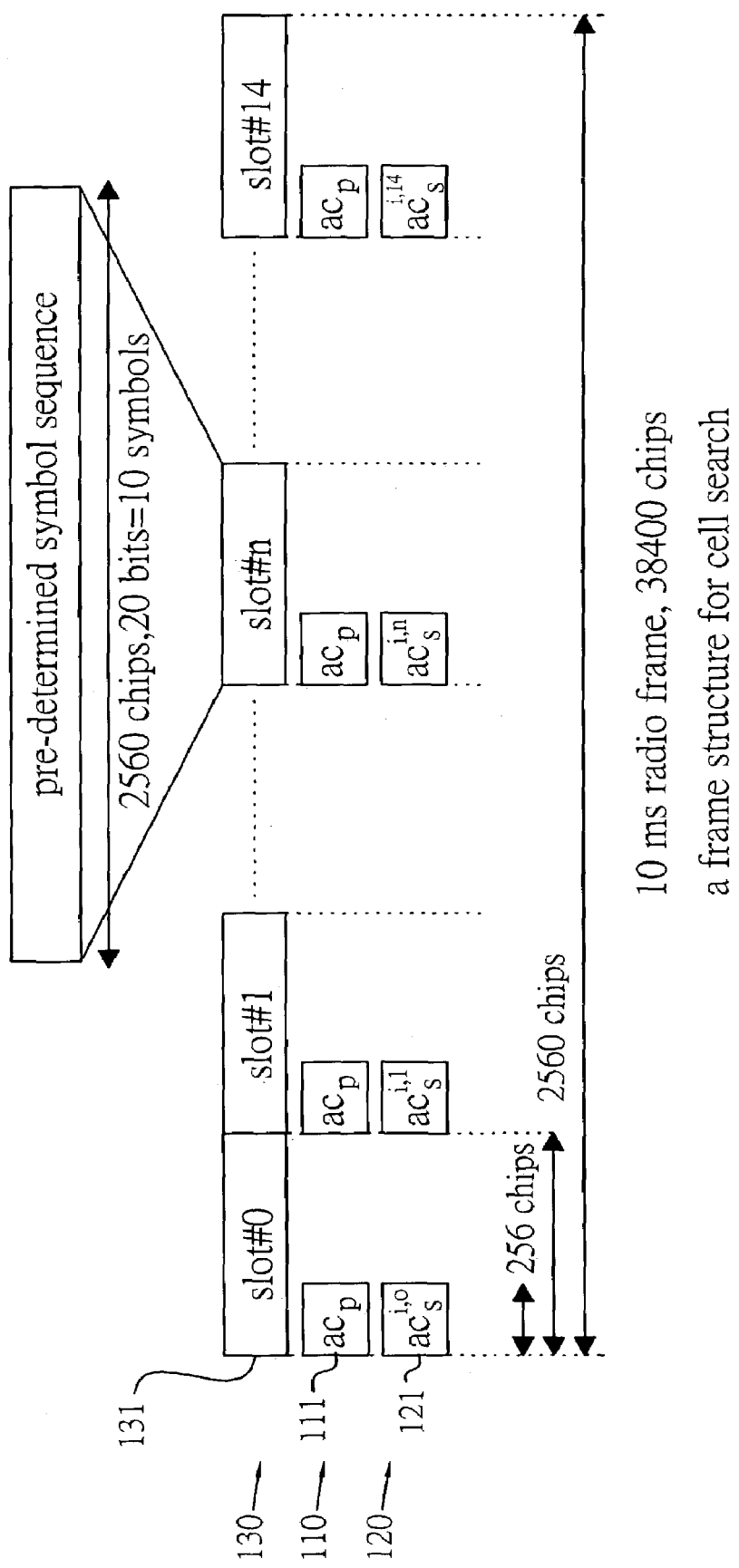
FIG. 1 illustrates a frame structure for use in a 3GPP W-CDMA/FDD system.
Figure 2A:
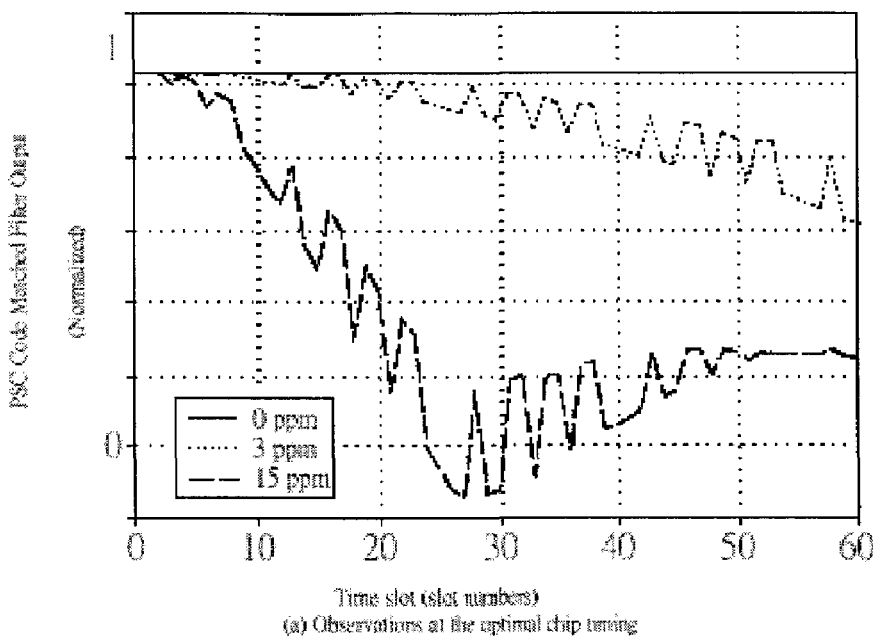
FIGS. 2(a) and 2(b) illustrate the decrease of signal level and the increase of the interferences between chips under the effect of sampling point drift caused by frequency offsets according to prior art technology.
Figure 2B:
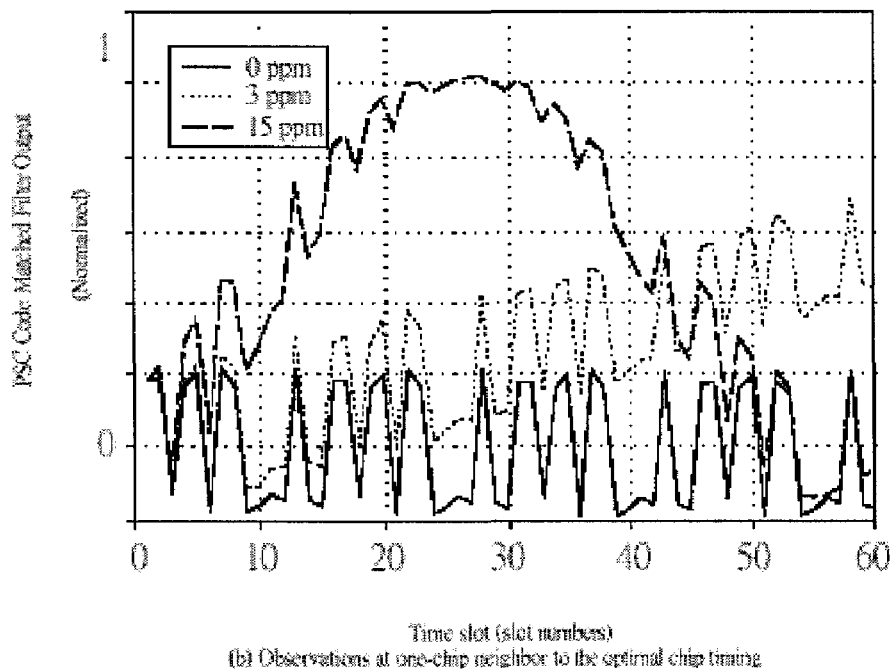
Figure 3:
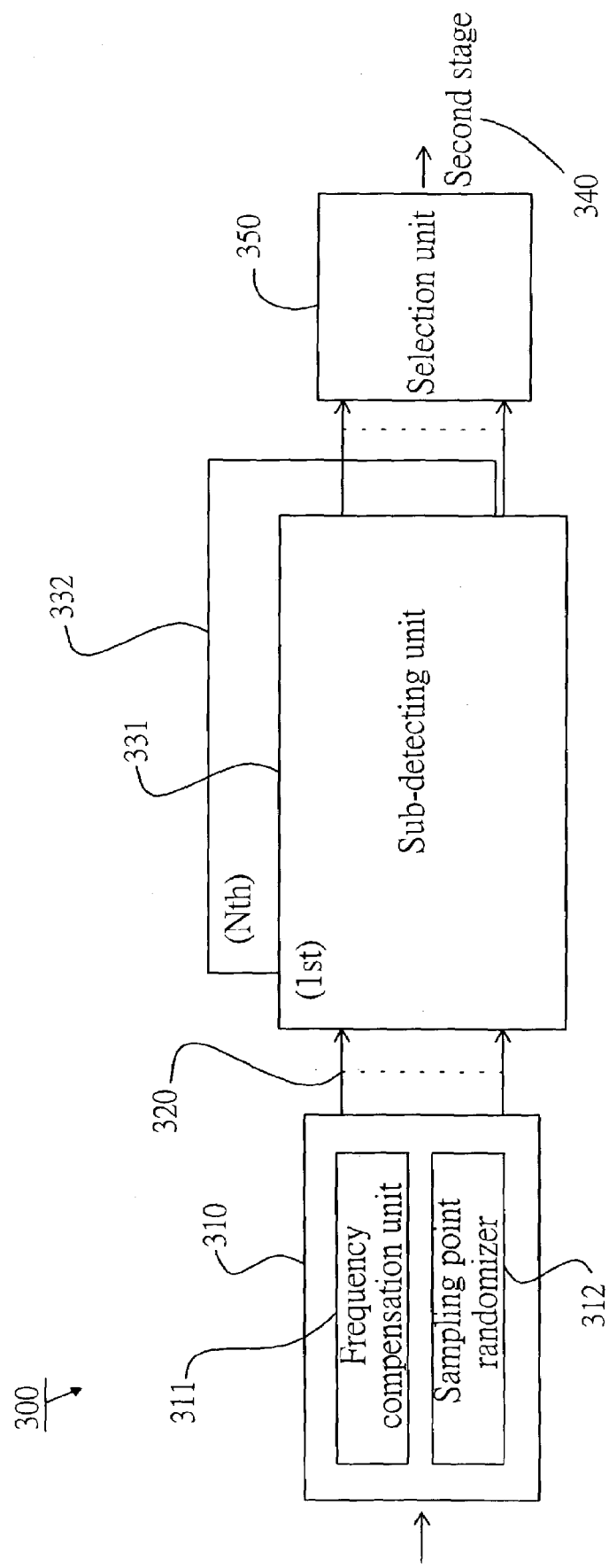
FIG. 3 is a schematic diagram of a synchronization code detecting apparatus in accordance with the first embodiment of the present invention, wherein the synchronization code detecting apparatus uses a fully compensated structure.

FIG. 3 is a schematic diagram of a synchronization code detecting apparatus in accordance with the first embodiment of the present invention, wherein the synchronization code detecting apparatus uses a fully compensated structure. The synchronization code detecting apparatus 300 provides compensations for the phase rotation and the clock offset, wherein the synchronization code detecting apparatus 300 includes a compensation unit 310, a first switching interface 320, a plurality of sub-detecting units 331, 332, a second switching interface 340, and a selection unit 350.

Figure 6:
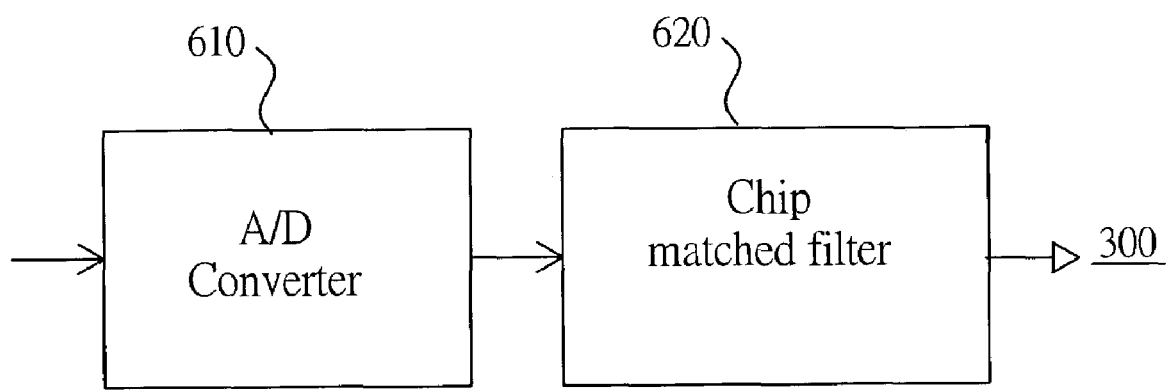
FIG. 6 is a schematic diagram illustrating the front end of the synchronization code detecting apparatus as shown in FIGS. 3 and 5.

The synchronization code detecting apparatus 300 is used for cell search in a CDMA system and, more particularly, for use in the cell search for the 3GPP W-CDMA/FDD system that consists of three stages. It is featured in the capability of mitigating the adverse effect on cell search caused by the clock offset in the first stage and of achieving high-speed cell search. The implementation of the embodiment of the present invention is described by additionally referring to FIG. 6 that illustrates a pre-processing unit before the synchronization code detecting apparatus as shown in FIG. 3. Refer to FIG. 6 for showing the pre-processing unit which includes an Analog/Digital converter 610 and a chip matched filter unit 620. The Analog/Digital converter 610 converts the incoming signal passes from analog signal into digital signal. The Analog/Digital converter 610 is also capable of signal sampling. The chip matched filter unit 620 is connected to the Analog/Digital converter 610 for matching the incoming signal and sending the incoming signal into the synchronization code detecting apparatus 300 sequentially.

Figure 7A:
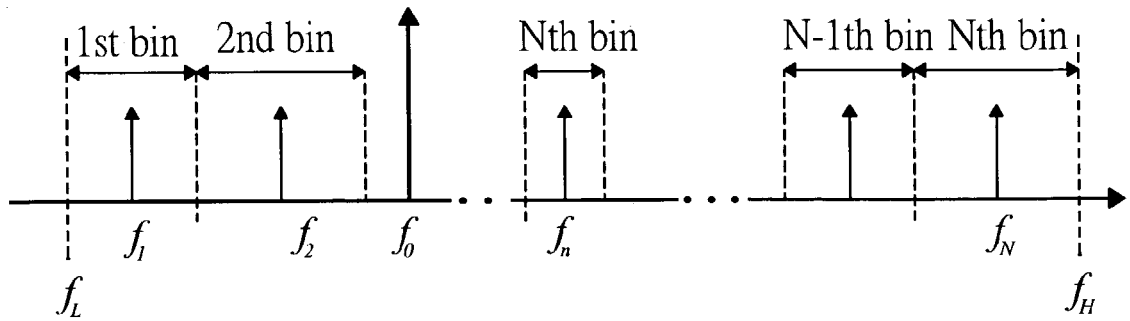
FIG. 7(a) is a schematic diagram illustrating a multiple-bin representation of unequal bin size in accordance with an embodiment of the invention.
Figure 7B:
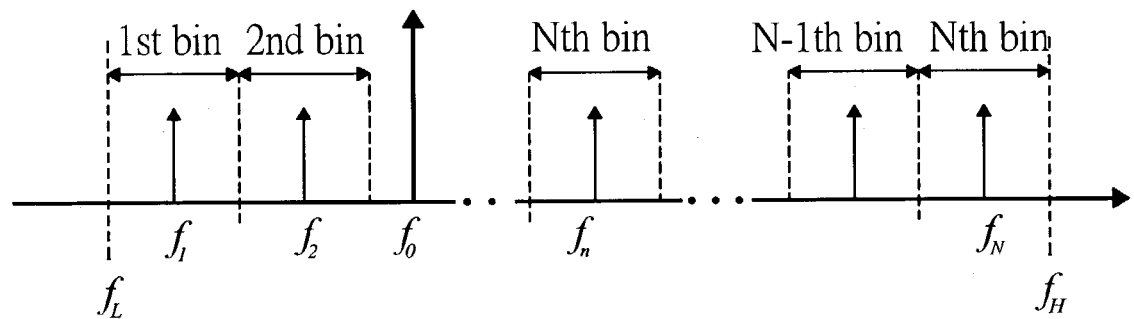
FIG. 7(b) is a schematic diagram illustrating a multiple-bin structure multiple-bin representation of equal bin size in accordance with an embodiment of the invention.

The compensation unit 310 provides frequency offset compensation to the incoming signal and determines the sampling points of the incoming signal. The compensation unit 310 includes a frequency offset compensation unit 311 for providing phase rotation compensation and clock offset compensation to the incoming signal, and a sampling point randomizer 312 for selecting the sampling points of the incoming signal. For example, when the incoming signal involves a great clock offset effect due to a frequency offset, the frequency offset compensation unit 311 will determine about how to divide the uncertain frequency range of the incoming signal into a plurality of cells in a manner that each cell has a sub-carrier frequency as the reference frequency of the plurality of sub-detecting units 331, 332 for processing the incoming signal. The number of the plurality of sub-detecting units 331, 332 depends on the number into which the uncertain frequency range of the incoming signal is divided. This number may be referred to as a bin number. Refer to FIGS. 7(a) and 7(b) for showing how to determine the number of the sub-detecting units 331, 332. The advantages of using a plurality of sub-detecting units are described as follows.

Referring to FIG. 7(a), the carrier frequency of the incoming signal is $f_0$. Owing to the limitation of the precision of the transistor oscillator, which is provided as the frequency and timing reference, there exists frequency error between the user's equipment and the base station's equipment. From the user's point of view, the carrier frequency of the incoming signals is distributed over $f_H$ and $f_L$. The range is herein referred to as an uncertain range of the carrier frequency. According to the bin-divided method of the invention, the uncertain range of the carrier is divided into a plurality of cells each having a sub-carrier frequency which serves as the reference frequency for the plurality of sub-detecting units 331, 332 for use in processing the incoming signal. The cell are referred to as bins. As shown in FIG. 7(a), the cells are formed by dividing a space into different spaces according to various ranges of the carrier frequency. A sub-carrier frequency is located at the middle of a cell. However, it is preferred to divide the uncertain range of the carrier frequency into different spaces of equal size. Referring to FIG. 7(b), the uncertain range of the carrier frequency is equally divided with a sub-carrier frequency located at the middle of each cell. If the uncertain range of the carrier frequency is divided into N bins, the $n^{th}$ sub-carrier frequency is represented by $f_n$, wherein n is greater than or equal to 1 and is smaller than or equal to N. The advantage of this multiple-bin structure can be achieved by dividing the uncertain range of the carrier frequency in a manner that each of the sub-carrier frequency is closer to the carrier frequency of the incoming signal. Consequently, the offset between the carrier frequency of the incoming signal and the reference frequency of the plurality of sub-detecting units 331, 332 can be reduced and therefore the adverse effect on cell search caused by the frequency offset can be mitigated.

Figure 4:
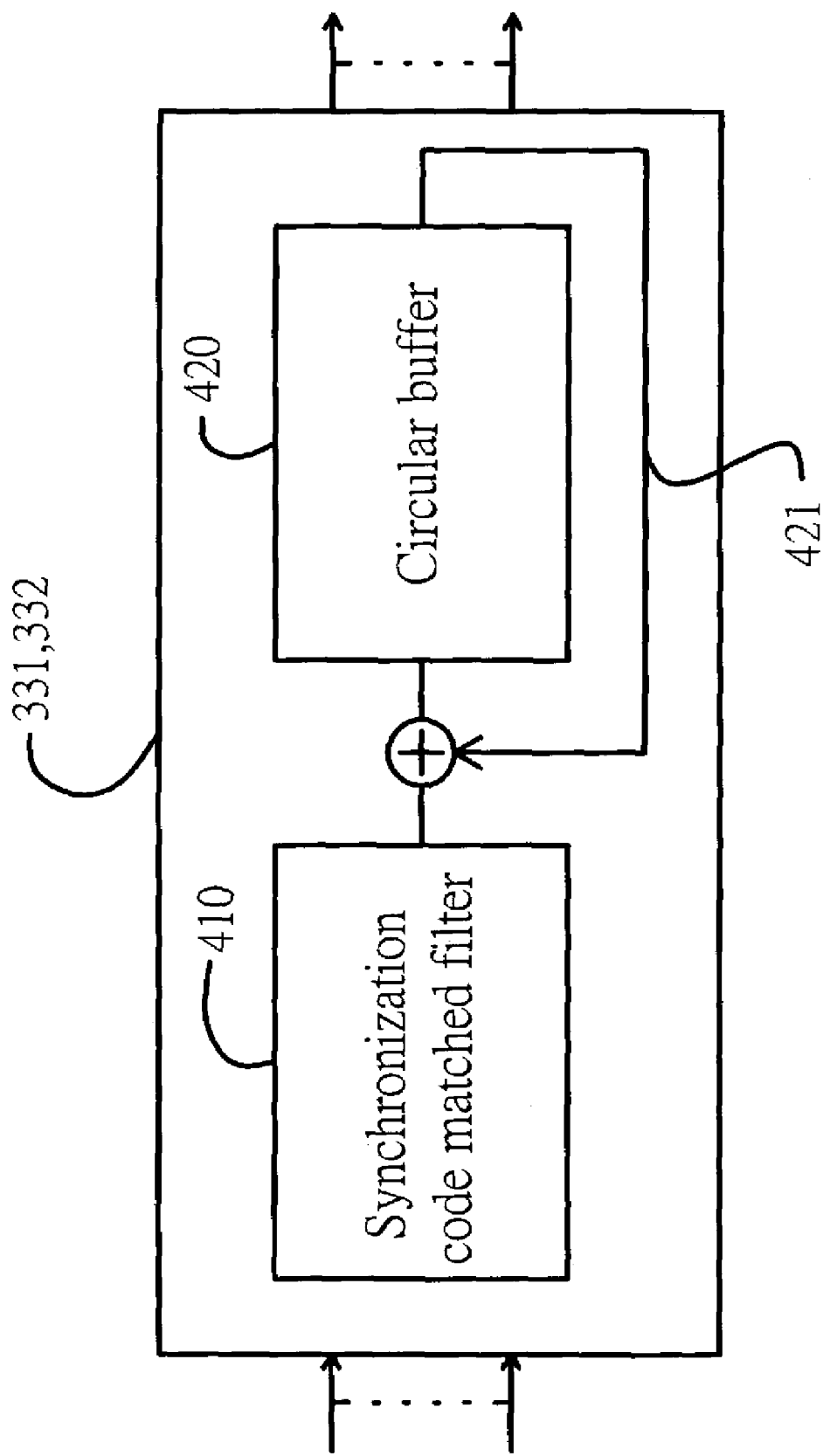
FIG. 4 is a schematic diagram of an embodiment of the sub-detecting unit as shown in FIG. 3.

The multiple-bin structure is especially designed for use at the first stage of cell search. Basically, the greater the number of bins the more the offset between the carrier frequency of the incoming signal there will be. Accordingly, the reference frequency for each sub-detecting unit 331, and 332 can be reduced. However, the greater number of bins means the more sub-detecting units are needed. This will inevitably increase the cost. Moreover, a sampling point randomizer 312 is adopted in a preferred embodiment of the invention for determining the sampling points of the incoming signal. The sampling point randomizer 312 randomly selects a sampling point in the digital form of the incoming signal. Alternatively, the sampling point randomizer 312 selects an optimal point from the digital form of the incoming signal. The optimal sampling point is the maximal value of the sampling points of the incoming signal. The selection of the sampling points determined by the sampling point randomizer 312 effectively eliminates the adverse effect on cell search caused by the clock offset of the incoming signal. Due to the functions of the frequency offset compensation unit 311 and the sampling point randomizer 312, the number of bins is greatly reduced and therefore there is no need of a large number of sub-detecting units. The first switching interface 320, coupled to the compensation unit 311 and having a plurality of switching ports, is for outputting the incoming signal, after being formed into bins, to multiple sub-detecting units. The sub-detecting units 331, 332, coupled to the first switching interface 320, is for detecting a synchronization code of the incoming signals, wherein the synchronization code is for synchronizing the incoming signals. Referring also to FIG. 4, a sub-detecting unit 331, 332 comprises a synchronization code matched filter 410 and a circular buffer 420. The synchronization code matched filter 410 is for matching and detecting the synchronization code. The synchronization code matched filter 410 divides the code chips of the synchronization code into various sections. The absolute value of the output of each section is accumulated. The circular buffer 420, coupled to the synchronization code matched filter 410, is for storing the synchronization code as a detection result. The synchronization code is then fed back via the path 421, and accumulated with its previous value to continuously determine a preferred candidate of the incoming signals. The second switching interface 340, coupled to the sub-detecting units 331, 332 and having multiple switching ports, is for outputting the incoming signal. The second switching unit 340 is coupled to the selection unit 350 for selecting multiple possible slot boundaries as candidates for transmitting from the output of the sub-detecting units 331, 332.

Figure 5:
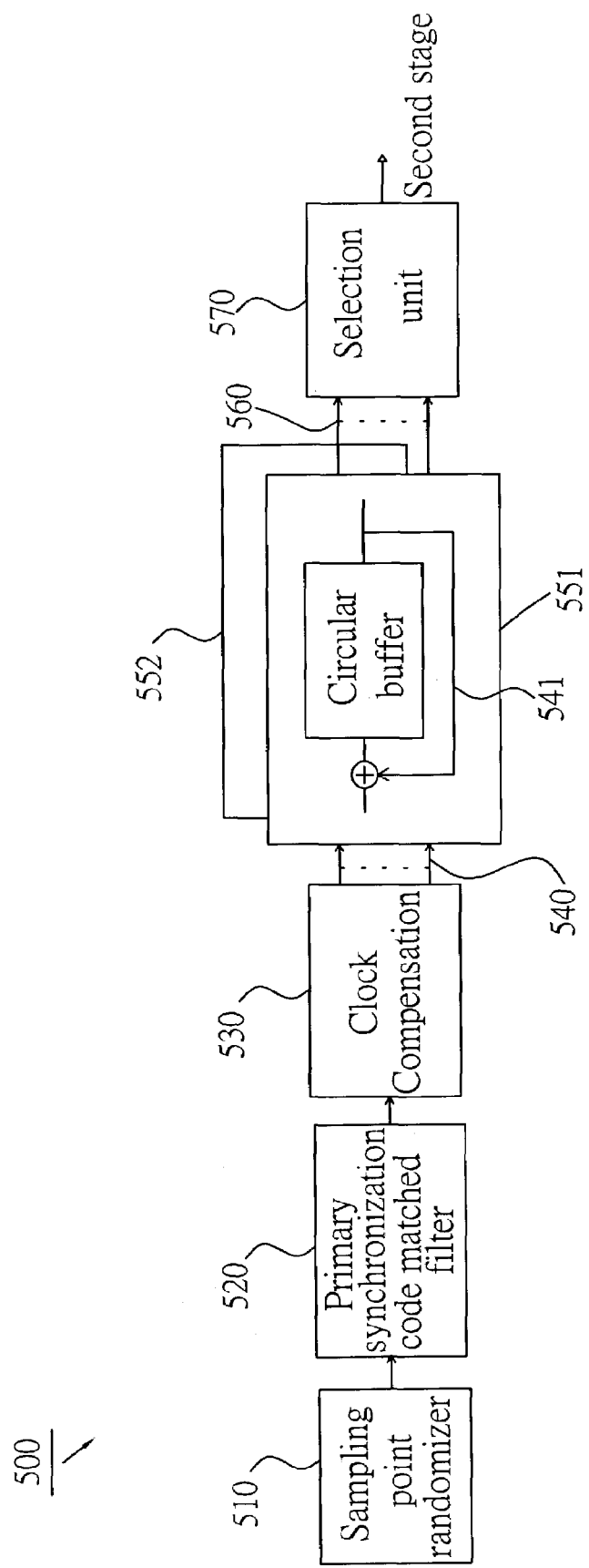
FIG. 5 is a schematic diagram of a synchronization code detecting apparatus in accordance with the second embodiment of the present invention, wherein the synchronization code detecting apparatus uses a partially compensated structure.

FIG. 5 is a schematic diagram of a synchronization code detecting apparatus 500 in accordance with the second embodiment of the present invention, wherein the synchronization code detecting apparatus uses a partially compensated structure. The synchronization code detecting apparatus 500 in accordance with the second embodiment, different from that in accordance with the first embodiment, only provides compensation for the clock offset and hands over the elimination of the phase rotation to a well-designed chip-matched filter. The synchronization code detecting apparatus 500 includes a sampling point randomizer 510, a synchronization code matched filter 520, a clock compensation unit 530, a first switching interface 540, multiple circular buffers 551, 552, a second switching interface 560, and a selection unit 570.

Referring now to FIGS. 5 and 6, an incoming signal is converted into digital signal by the A/D converter 610. The chip-matched filter 620, connected to the A/D converter 610, is for matching the incoming signal and sending the incoming signal into the synchronization code detecting apparatus 500. The sampling point randomizer 510 is for determining the sampling points of the incoming signal. The sampling point randomizer 510 randomly selects a sampling point from the digital form of the incoming signal or selects an optimal point from the digital form of the incoming signal. The optimal sampling point is the maximal value of the sampling points of the incoming signal. The selection of the sampling points of the incoming signal determined by the sampling point randomizer 510 effectively mitigates the adverse effect on cell search caused by the clock offset of the incoming signal. The synchronization code matched filter 520 is for matching and detecting the synchronization code. The synchronization code matched filter 520 divides the chips of the synchronization code into various sections and accumulates the absolute value of the output of each section. The clock compensation unit 530 is for compensating the clock offset of the incoming signal. For example, when the incoming signal involves a great clock offset effect due to a frequency offset, the clock compensation unit 530 will divide the uncertain frequency range of the incoming signal into a plurality of cells each having a sub-carrier frequency as the reference frequency the circular buffers 551, 552 so as to process the incoming signal. The number of circular buffers 551, 552 depends on the number of uncertain frequency ranges the incoming signal has been divided into. As described in the above, the first switching interface 540, coupled to the clock compensation unit 530 and having multiple switching ports, is for outputting the incoming signal to multiple circular buffers 551, 552. The circular buffers 551, 552, coupled to the first switching interface 540, store the synchronization code as a detection result which is fed back to the circular buffer 551, 552 via a path 541 and accumulated with its previous result, so as to continuously determine preferred shot boundaries of the incoming signal. The second switching interface 560, coupled to the circular buffers 551, 552 and having multiple switching ports, is for outputting the incoming signal. The selection unit 570, coupled to the second switching interface 560, is for selecting multiple possible slot boundaries as candidates transmitting from the output of the buffers 551, 552 for use in the next stage of cell search.

In practical applications, due to the reason that the function of each of the blocks is clear and definite, the synchronization code detecting apparatus in accordance with the first and the second embodiments of the invention can be implemented by a combination of software and hardware, and more particularly can be implemented by a chip embedded in a cell search circuit.

Figure 8:
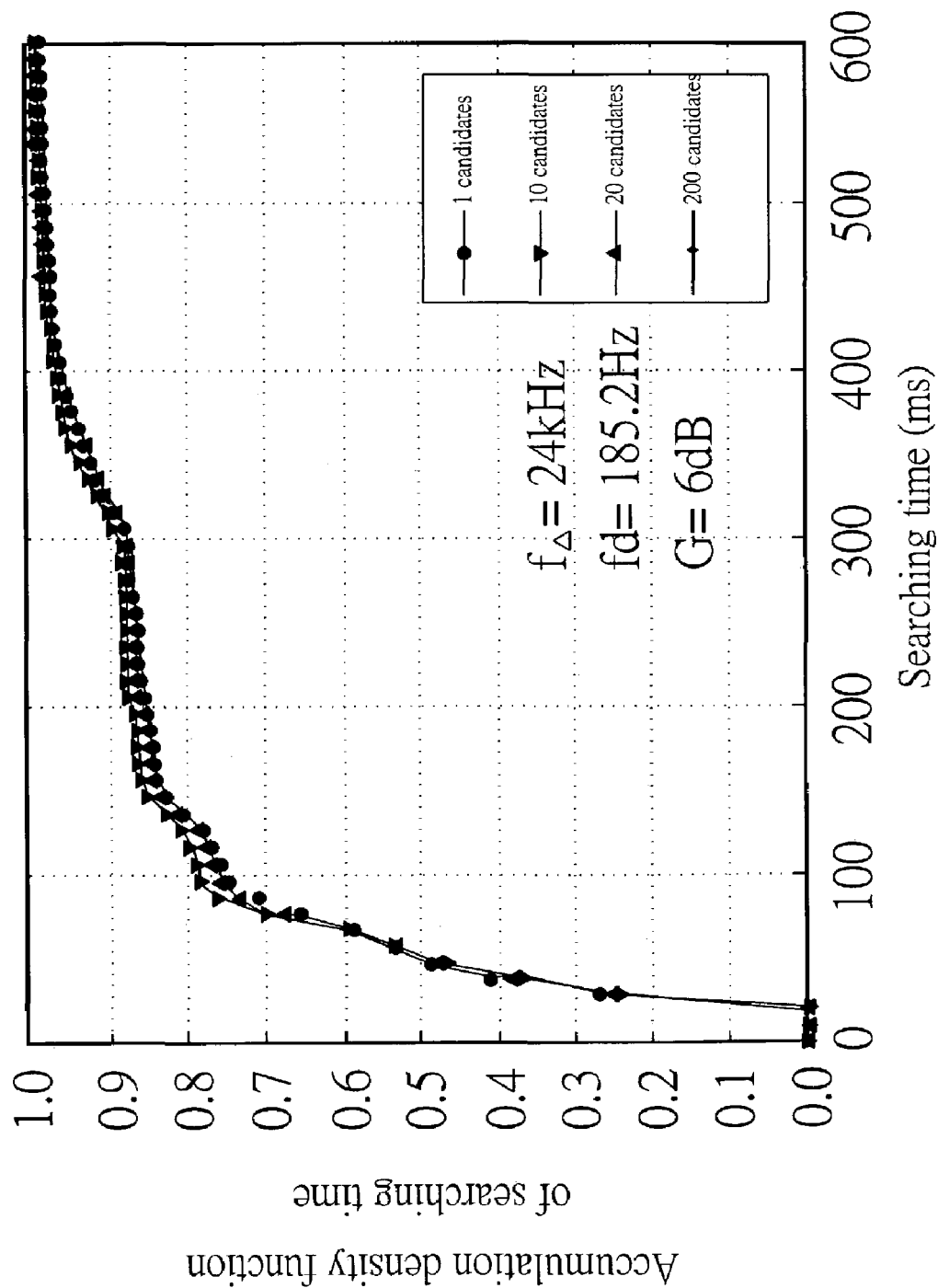
FIG. 8 is a graph comparing the performance characteristics of the cell search with various number of candidates and the effect of frequency offset $f\Delta=24$ kHz according to the embodiment of the present invention.

FIG. 8 is a graph comparing the performance characteristics of the cell search with various number of candidates and the effect of frequency offset fΔ=24 kHz according to the embodiment of the present invention. For simplicity, the process time of the deciding selection stage in the first stage is equal to that of the second stage. If the process time of the deciding selection stage is X times longer than the process time of the pre-selection stage, the dwell time is expressed as X+1. The first stage illustrated in FIG. 8 adopts the condition of 3 bins and 2 dwell-time. The first stage selects a plurality of slot boundaries as a plurality of candidates from the primary synchronization code and transmits the plurality of candidates into the second stage. 10 candidates transmitted to the second stage are better in performance.

Figure 9:
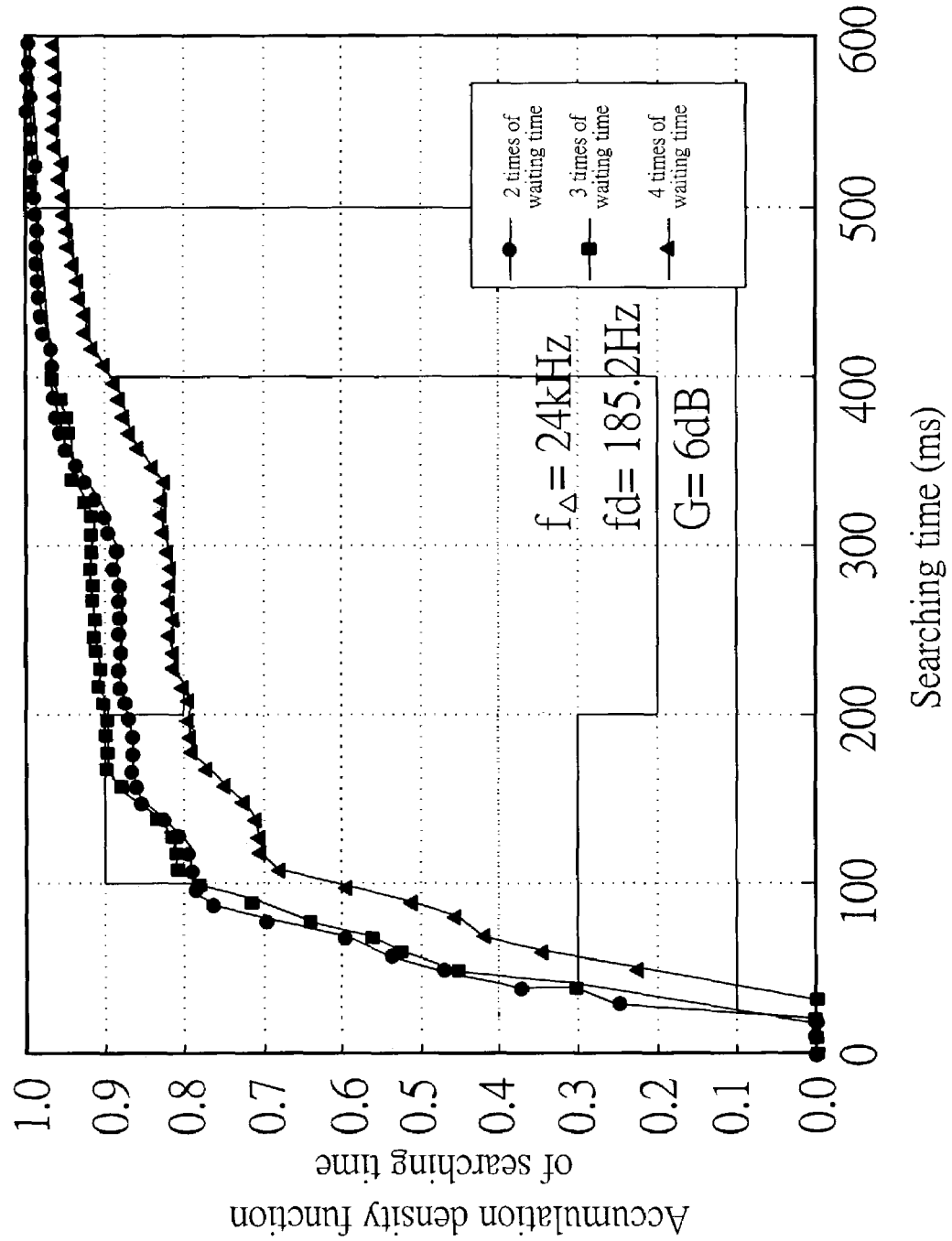
FIG. 9 is a graph comparing the performance characteristics of the cell search with the dwell time and the effect of frequency offset $f\Delta=24$ kHz according to the embodiment of the present invention.

FIG. 9 is a graph comparing the performance characteristics of the cell search with the dwell time and the effect of frequency offset fΔ=24 kHz according to the embodiment of the present invention. The random sampling per frame scheme is used in the first stage, the second stage, and the third stage. The random sampling per frame continuously determine preferred slot boundaries of the incoming signal. The second adopts the condition of 3 bins and 10 candidates in the first stage. As illustrated in FIG. 9, under the condition of 3 bins in the first stage and the second stage, four times of dwell time is not suitable.

The synchronization code detecting apparatus of the invention is for cell search in a code division multiple access (CDMA) systems and, more particularly, for use in the cell search of the 3GPP W-CDMA/FDD system that consists of three stages. It is featured in the capability of mitigating the adverse effect on cell search caused by the frequency offset and of high-speed cell search. Computer simulations can be used for exploring the cell search apparatus in accordance with the invention, i.e. the performance comparison between the fully compensated structure and a partially compensated structure.

Similar to those as illustrated in the drawings, the number of bins is preferably reduced to the minimum so as to maintain a lowest tolerable efficiency for correct cell search. Moreover, the performance of the synchronization code detecting apparatus in accordance with the first embodiment is better than those of the second embodiment. However, compared with the synchronization code detecting apparatus having a partially compensated structure in accordance with the second embodiment, the synchronization code detecting apparatus having a fully compensated structure in accordance with the first embodiment involves a higher power consumption and operation complexity. Thus, these two implementations can be chosen based on different needs and considerations.

From the above description, it can be understood that the synchronization code detecting apparatus in accordance with the invention can effectively mitigate the adverse effect on cell search caused by the frequency offset and can achieve initial synchronization rapidly.

The synchronization code detecting apparatus in accordance with the invention for cell search in a code division multiple access (CDMA) systems can effectively enhance the system efficiency under the chip clock offset effect caused by the frequency offset. The complexity and performance can be compromised by the designer under the flexible hardware design. It is believed that the synchronization code detecting apparatus can be used in a mobile device and a personal data assistant (PDA) system.

Although the preferred embodiments of the invention has been illustrated and described, it will be obvious to those skilled in the art that various modifications can be made without departing from the scope and spirit of the invention defined by the appended claims.

TABLE 1

Chip sampling point drift caused by different frequency drifts in 30 ms test

| Frequency drift (kHz) | Sampling point drift (Tc) | | |
|---|---|---|---|
| | 10 ms | 20 ms | 30 ms |
| 0 | 0 | 0 | 0 |
| 6 | 0.1152 | 0.2304 | 0.3456 |
| 8 | 0.1536 | 0.3072 | 0.4608 |
| 12 | 0.2304 | 0.4608 | 0.6912 |
| 24 | 0.4608 | 0.9216 | 1.3824 |

What is claimed is:

1. A synchronization code detecting apparatus for use in cell search in CDMA systems, comprising:

means for receiving and detecting an incoming signal from a base station, the incoming signal having an uncertain range of carrier frequency caused by frequency offset, a sampling point randomizer for selecting a plurality of sampling points of the incoming signal;

a synchronization code matched filter for matching and detecting a synchronization code from the sampling point of the incoming signal;

a clock compensation unit for providing clock offset compensation to the synchronization code of the incoming signal;

a plurality of circular buffers for storing the synchronization code and continuously determining a plurality of preferred slot boundaries of the incoming signal; and a selection unit coupled to the output of each of the plurality of circular buffers for selecting candidates from each output of said circular buffers to be forwarded to a second stage processing.

2. The synchronization code detecting apparatus as claimed in claim 1, wherein the sampling point randomizer selects the sampling points of the incoming signal randomly.

3. The synchronization code detecting apparatus as claimed in claim 1, wherein the sampling point randomizer selects an optimal sampling point from the sampling points.

4. The synchronization code detecting apparatus as claimed in claim 3, wherein the optimal point is the maximal value of the sampling points.

* * * * *